United States Patent

Gabriel

[15] 3,693,090

[45] Sept. 19, 1972

[54] WIRED BROADCASTING SYSTEMS

[72] Inventor: Ralph Parton Gabriel, Woking, England

[73] Assignee: Communications Patents Limited

[22] Filed: Aug. 8, 1969

[21] Appl. No.: 848,567

[30] Foreign Application Priority Data

Aug. 9, 1968 Great Britain..........38,108/68

[52] U.S. Cl.................325/308, 178/DIG. 13, 325/31

[51] Int. Cl...........H04b 3/28, H04b 3/50, H04n 7/10

[58] Field of Search...........178/DIG. 13; 325/308, 31

[56] References Cited

UNITED STATES PATENTS

| | | | |
|---|---|---|---|
| 2,031,075 | 2/1936 | Scheibell | 178/DIG. 13 |
| 3,350,647 | 10/1967 | Gabriel | 325/308 |
| 3,084,213 | 4/1963 | Lemelson | 178/DIG. 22 |
| 3,188,384 | 6/1965 | Townsend | 178/DIG. 13 |
| 3,465,344 | 9/1969 | Scott | 325/308 |
| 2,301,223 | 11/1942 | Mitchell | 178/DIG. 13 |
| 3,255,306 | 6/1966 | Campbell | 178/DIG. 13 |

*Primary Examiner*—Howard W. Britton
*Attorney*—Laurence R. Brown

[57] ABSTRACT

A wired broadcasting system for television transmission from a plurality of sources to individual subscriber stations has switching apparatus at a central station actuated by signals at the subscriber station. A four wire cable arrangement to each subscriber provides two control wires and two signal wires. Provision for station selection, audience response and numbers of subscribers is made through use of time signals passed through the control wires. Provisions for accepting charges and recording the time in use are made at the central station.

14 Claims, 4 Drawing Figures

INVENTOR
Ralph P. Gabriel
BY
Laurence R. Brown
ATTORNEY

INVENTOR
Ralph P. Gabriel
BY
Laurence R. Brown
ATTORNEY

WIRED BROADCASTING SYSTEMS

This invention relates to wired broadcasting systems for television signals and seeks to provide an improved form thereof.

Wired broadcasting systems for audio transmission have been known for many years as evidenced for example by British Pat. Nos. 258,691 and 247,550 supplying signals from a central bank of audio sources to individual lines of subscribers at remote locations. Use of telephone lines for switching and connection is disclosed in British Pat. No. 500,139.

However such systems were not suitable for television signal transmissions at higher frequencies and with wide pass bands because of interference and noise problems introduced in such systems and the necessity for much closer control over transmission fidelity.

Accordingly wired systems for television were introduced in the art as evidenced by British Pat. No. 954,916, which provided for a network of signal lines into which subscribers could tap in locally by switching circuits at the receiver. This sort of distributed signal system also is subject to introduction of noise and distortion at various local subscriber locations which may be passed on to many other subscribers.

Wired broadcasting systems have developed into two general classes. In the first, frequency distinctive signals in respect of a plurality of programs are transmitted to subscribers over a wide band cable network, usually of the coaxial type, and program selection is affected by frequency selection in the subscriber's terminal equipment. In the second class, the signals in respect of a plurality of programs are transmitted over separate, relatively narrow band signal paths on frequencies which lie in a common frequency band or in two closely adjacent or overlapping frequency bands, program selection being affected by the selective connection of the terminal equipment to the signal path carrying the program which it is desired to receive.

Wired broadcasting systems of the first class are inherently restricted in their capacity to carry large numbers of programs primarily due to the technical limitations of amplifying a large number of signals simultaneously in the repeater amplifiers which are required in a practical network, and also to the limitations of frequency discrimination possible in subscriber's terminal equipment of economically produceable design.

Wired broadcasting systems of the second class are inherently much less restricted in their capacity to carry large numbers of programs because each signal path is usually arranged to carry only one program signal. Thus the technical limitations of the necessary repeater amplifiers are not exceeded. In practice, wired broadcasting systems of this class having up to six television programs and up to six sound only programs can be constructed, the signals being distributed to the subscribers over a single multi-pair cable provided that the cable has a satisfactory cross-talk protection between its signal pairs. Such a system is inherently very simple and is economical to install and operate. However, when there are a large number of programs, for example, thirty or more, to be distributed over a wired broadcasting system, the additional cost of the extra cable pairs to provide the separate signal paths for each of these number of programs is greater than the cost of equipment to effect program selection at a centralized location, for example, at a "program exchange". Once program selection is arranged to be effected at a so-called "program exchange" it becomes possible to provide subscribers to the system with an almost limitless number of programs. In addition, because each subscriber in such a wired broadcasting system has exclusive use of a signal path between his terminal equipment and the "program exchange", it becomes possible to provide them with additional services which were hitherto impractical. Such additional services may, for example, include the subscriber origination of programs, data exchange, computer interrogation and control, the step by step actuation of visual teaching machines, telecontrol of apparatus under visual supervision, placing of orders for advertised merchandise, the participation in consumer demand or program popularity surveys and others. Specific additions or modifications to the basic invention described herein can be made to provide additional services of these kinds and some are described in our Application U.S. Ser. No. 42,773 filed June 2, 1970.

An important economic advantage of a wired broadcasting system incorporating a "program exchange" in accordance with the present invention is that each subscriber or small group of subscribers can be connected to the "program exchange" as and when they become subscribers to the system, their corresponding exchange equipment being installed upon such connection. Thus, to start such a system, only a modest outlay of capital on exchange equipment and cable may be required whereas with the other wired broadcasting systems all the program transmission facilities and all the signal paths have to be provided initially over the whole area in which the wired broadcasting system is to operate, regardless of how small an initial audience is to be expected.

The practical realization of the present invention relies on the employment of suitable cable for connecting each subscriber to the "program exchange". Such a suitable cable comprises a plurality of pairs of twisted together insulated conductors which serve for the transmission of high frequency signals arranged in a compact symmetrical group about a center core element, and a further plurality of pairs of conductors which serve for the transmission of audio frequency signals arranged within the circumscribing cylinder of this group. Cables of this type have unusually high-cross talk protection which is believed to be due at least in part, to the screening effect of the intersticial audio frequency pair on its associated high frequency pair. Cables of this type have already been used in wired broadcasting systems of the conventional type, each of the high frequency pairs having been arranged to carry corresponding television signals together with their accompanying sound signals between the wired broadcasting station and those subscribers desiring said television signals, and the intersticial audio frequency pairs having been arranged to carry corresponding sound only programs between said wired broadcasting station and those subscribers desiring said sound only programs. In the present invention such a cable is utilized in a novel manner, in that each high frequency pair and its associated intersticial audio frequency pair, are arranged to be connected between a "program exchange" and a single corresponding subscriber, the high frequency pair being utilized to convey frequency signals from the "program exchange" to the subscriber's terminal equipment, and the intersticial audio frequency pair being utilized to convey control signals in respect of program selection in the reverse direction from the subscriber's terminal equipment to the "program exchange". The utilization of the cable in this manner has no significant effect on its outstanding cross-talk protection.

A further aspect for the practicability of the present invention lies in the development of effective program selection devices for use on the "program exchange" which are inexpensive but reliable. Some such devices for the subject of our Applications U.S. Ser. Nos. 19,378 filed Mar. 13, 1970 and 42,674 filed June 2, 1970.

Accordingly, the invention provides a wired broadcasting system in which the connection between a program exchange and a subscriber's terminal unit is effected by means of a cable which comprises a twisted together pair of insulated signal conductors in respect of program signals passing from the program exchange to the subscriber's terminal unit, and a pair of control conductors in respect of control signals relating to program selection passing from the subscriber's terminal unit to the program exchange, each of the pair of control conductors being located in a corresponding one of a pair of interstices formed between the pair of signal conductors.

The invention further provides a wired broadcasting system comprising a plurality of transmitting equipments each in respect of a different broadcasting program, a conductive path between each of said plurality of transmitting equipments and a program exchange, a program selection device in the program exchange for connecting a subscriber's feeder to at least some of said conductive paths, thereby to be effective to derive program signals therefrom and a subscriber's feeder extending between the program exchange and a subscriber's terminal unit, the subscriber's feeder comprising a pair of twisted together signal conductors for conveying program signals between the program exchange and the subscriber's terminal unit, the signal conductors forming between them a pair of interstices in each of which is located a corresponding one of a pair of control conductors for conveying control signals between the subscriber's terminal unit and the program selection device in the program exchange.

The "program exchange" will contain a plurality of program selection devices each in respect of a corresponding subscriber. The subscriber's feeder extending between the program exchange and each subscriber, may each comprise one of a plurality of similar feeders contained within a common cable. Preferably the control conductors of the subscriber's feeder have a diameter not greater than two thirds that of the signal conductors so as to be contained within the circumscribing cylinder defined by said signal conductors. The control conductors may, if desired, be devoid of insulation and may be formed of any suitable conductive material, such, for example, as copper or aluminum.

The program selection devices may be so arranged that the selection of some programs is restricted to selected subscribers. The program selection devices may also be arranged to select some of the programs only in response to a payment or acceptance of cost debiting by the subscriber selecting one of those programs.

It is accordingly an object of this invention to produce an improved wired broadcasting system, which is economical and which will provide high fidelity transmission of television signals to a plurality of subscriber locations.

In accordance with one feature of the present invention, there is provided a wired broadcasting system in which a connection is made between a central program exchange and the subscriber's terminal unit by a cable having a twisted together pair of insulated signal conductors to carry program signals and, a pair of control conductors for selecting the program at the program exchange from signals derived at the subscriber's terminal unit. The two pairs of conductors are arranged in a cable so that wires from the pair of control conductors are located in corresponding interstices formed between the pair of signal conductors.

According to a more specific feature of the invention there is provided a wired broadcasting system comprising a plurality of transmitting equipments for producing different broadcasting programs, a transmission path between the transmitting equipments and a program exchange, a program selection device in the program exchange, and subscriber's terminal units. The subscriber's feeder comprises a pair of twisted together signal conductors for conveying program signals between the program exchange and the subscriber's terminal unit and a pair of control conductors located in interstices between the signal conductors for conveying control signals between the subscriber's terminal unit and the program selection device in the program exchange.

The program exchange will contain a plurality of program selection devices each connected to a corresponding subscriber's terminal unit. The subscriber's feeder sub-cable extending between the program exchange and each subscriber, may each comprise one of a plurality of similar feeders contained within a common cable. Preferably the control conductors of the subscriber's feeder have a diameter not greater than two thirds that of the signal conductors so as to be contained within the circumscribing cylinder defined by said signal conductors. The control conductors may, if desired, be devoid of insulation and may be formed of any suitable conductive material, such, for example, as copper or aluminum.

The program selection devices may be so arranged that the selection of some programs is restricted to selected subscribers. The program selection devices may also be arranged to select some of the programs only in response to a payment or acceptance of cost debiting by that subscriber selecting one of those programs.

Further features and advantages of the present invention will become apparent from the following description of two particular embodiments thereof with reference to the accompanying drawing in which.

Figures 1, 2, 3:
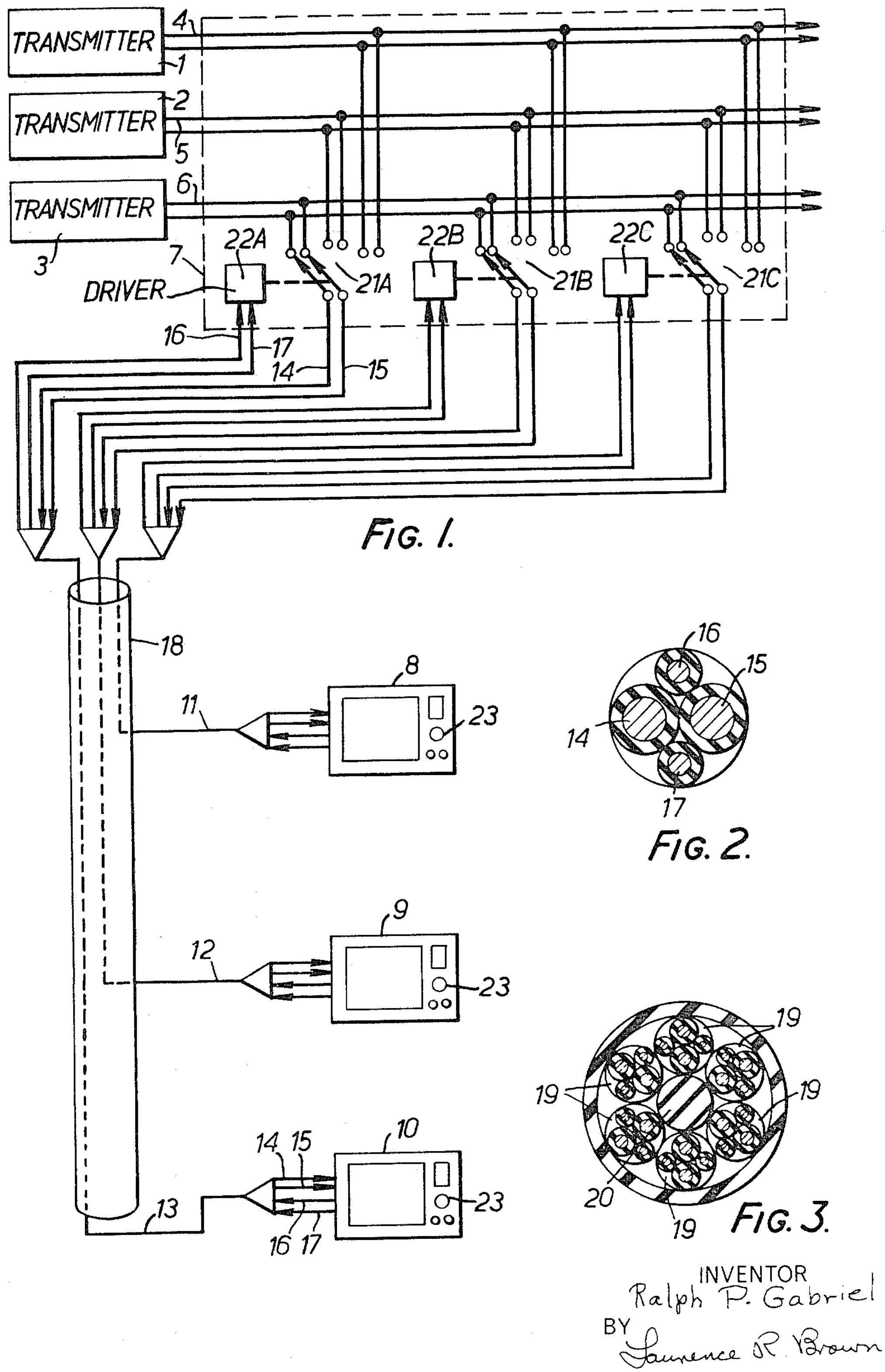
FIG. 1 is a block schematic diagram of a wired broadcasting system in accordance with the present invention.
FIG. 2 is a cross-sectional view of a subscriber's feeder utilized in the system shown in FIG. 1.
FIG. 3 is a cross-sectional view of a complete cable having a plurality of subscribers' feeders suitable for use in the system of FIG. 1.

In the wired broadcasting system shown in FIG. 1, three television transmitting equipments, 1, 2, 3, are each connected to a corresponding conductive path 4, 5, 6, which comprises a pair of conductors and extends between the transmitting equipment and a program exchange 7, which may be one of several in the wired broadcasting system. The program exchange embodiment shown in FIG. 1, is arranged to provide for the connection of three different subscribers to any one of the conductive paths, 4, 5, 6 carrying high frequency television signals from the different transmitting equipments. In practice a program exchange may serve for the connection of, for example, one thousand or more subscribers, and provide a large number of programs, for example, 10 to 30 or more programs. Extending between the program exchange and each of the three subscribers' terminal television receiver units, 8, 9, 10, is an individual subscriber's feeder 11, 12, 13. Each subscriber's feeder comprises a twisted together pair of insulated signal conductors 14, 15, see FIG. 2, which are suitable for the transmission of high frequency signals, for example, in the frequency range of 4 to 11 MHz, modulated by television signals and/or also carrying sound signals at audio frequency, these sound signals being either the sound accompaniment of the television program or a sound program. The conductors 14, 15, form between them a pair of interstices in which are located corresponding ones of a pair of control conductors, 16, 17. Preferably, these conductors are insulated and have an over all diameter not greater than two thirds that of the signal conductors 14, 15, so as to be contained within the circumscribing cylinder defined by the signal conductors, 14, 15. Three subscribers' feeders 11, 12, 13, are combined together in a common cable 18, which extends from the program exchange to the most remote subscriber's terminal unit 10, and passes adjacent the less remote subscribers' terminal unite 8 and 9. The subscriber's feeder pertaining to each subscriber is terminated at the location of each subscribers' terminal unit as required. formed, Although only three subscribers' feeders are, for clarity, shown in the common cable 18, at least six and preferably 42 or more subscribers' feeders would in practice be housed within a common cable as mentioned previously. A suitable arrangement of such a common cable housing six pairs of subscribers' feeders is shown in FIG. 3. In this cable the six subscribers' feeders 19, each comprising a pair of signal conductors and a pair of control conductors arranged as shown in FIG. 2, are laid up around a core element 20, formed, for example, by a string of insulating material such as polythene. Seven such cables, laid-up six around one and arranged within a common housing could contain 42 subscribers' feeders.

Referring to FIG. 1, the program exchange 7, is arranged to house a program selection switching device 21 for each subscriber's feeder by means of which the signal conductors 14/15 of the subscriber's feeder may be connected to a desired one of the conductive paths 4, 5 and 6. The program selection device 21, is arranged to be positioned by means of a driving arrangement 22, which may for example, comprise an electromagnetic operating homing or stepping switch which is controlled individually by each subscriber over the control conductors 16, 17. Each subscriber's terminal unit 8, 9, 10, may be provided with a program selection switch 23, by means of which various potentials or other forms of control signal may be applied to the control conductors 16, 17 at the subscriber's terminal unit for actuating the respective driving arrangement 22.

Figure 4:
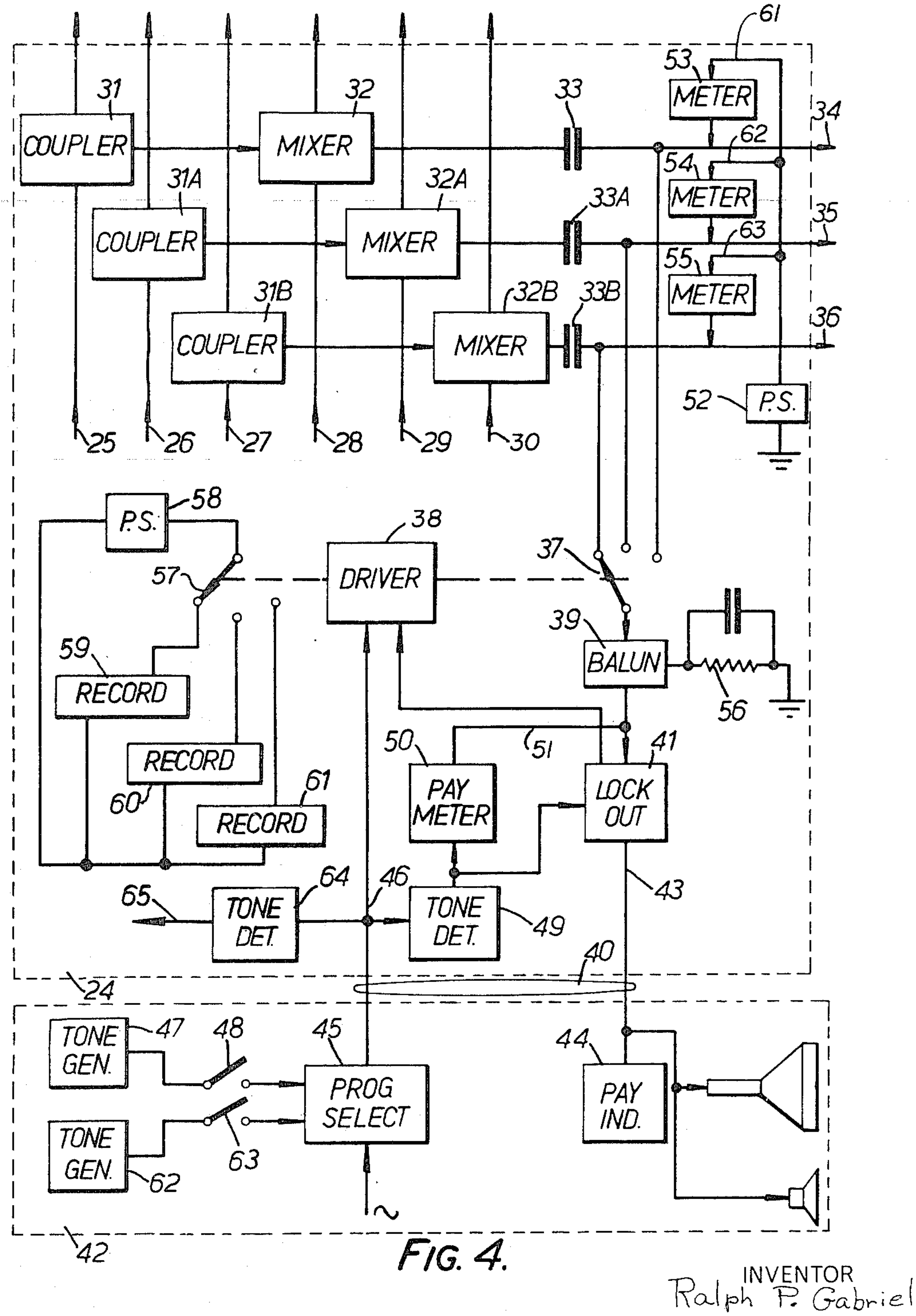
FIG. 4 is a block schematic diagram of a modified form of wired broadcasting system in accordance with the present invention.

In the modified form of wired broadcasting system shown in FIG. 4 a program exchange 24 is connected to a program trunk or toll route comprising coaxial cables 25, 26 and 27 carrying vision signals and audio signal pairs 28, 29 and 30 carrying sound signals and which may also serve for the transmission of control and supervisory signals through matching transformers or coupling devices 31, and sound vision mixers or combiners 32. The capacitors or other units 33 provide isolation of the equipment in the program exchange for DC signals. The programs are distributed throughout the program exchange by buss bars 34, 35 and 36, to which are connected program selection switching devices, one of which is shown at 37. The program selection device 37 is controlled by an actuating mechanism or driver 38 which may, for example, comprise an electro-magnetic operating solenoid and advancing mechanism. Program signals selected by the switching device 37 are applied to a balun transformer 39 to convert the unbalanced signals in the exchange to balanced signals for transmission over the subscriber's feeder 40. This subscriber's feeder may be of the kind shown in FIG. 2 and may form part of a common cable containing a plurality of similar subscribers' feeders such as shown in FIG. 3. Output signals from the balun transformer 39 are passed through a pay program lock out switch 41 and thence to the subscriber's terminal unit 42 over the signal conductor pair indicated by the line 43. Associated with the subscriber's terminal unit 42 is a pay program indicator 44 which is arranged to indicate to the subscriber the fact that a program which has been selected is one for which a payment will be required. The subscriber's terminal unit includes a program selection switch 45 by means of which control signals can be generated and passed back to the program exchange 24 over the control signal pair in the subscriber's feeder 40 indicated by the line 46 for controlling the actuator 38. The program selection switch 45 may be so arranged that a clearance signal is sent to the program exchange to return the program selection device 37 to a datum position each time the subscriber's terminal unit is switched off. In the case of the selection of a pay program, the subscriber is required to indicate his acceptance of such a program by sending a signal of a kind to which the actuator 38 is unresponsive and which is provided by the tone generator 47 over the control pair 46 by means of an acceptance button switch 48 provided on the terminal unit. The signal provided by the generator 47 is detected by a responsive device 49 which unlocks the switch 41 and registers the appropriate debit on the subscriber's pay meter 50. The cost of the program registered by the meter 50 may be determined in accordance with signals which accompany the pay program and which can be recognized by the device 50, these signals being passed thereto over a line 51 which is routed around the lock out switch 41.

It may be considered desirable to record the number of subscribers who receive certain of the programs provided by the wired broadcasting system, and to this end there is provided in the program exchange a constant voltage supply 52, which energizes each of the buss bars 61, 62, 63. The current taken from the supply 52 from any one of the buss bars is recorded by a corresponding current recording meter 53, 54, 55, the current drawn by each subscriber being determined by a metering resistor 56 associated with each subscriber's balun transformer 39.

It may be desired, for example, for market research purposes, to record the programs selected by certain of the subscribers connected to the program exchange. For this purpose the program selector device 37 has associated with it an auxiliary switch 57 which is arranged to connect a power supply 58 with one of the recording meters 59, 60, 61 which record the times and duration of the subscriber's selection of each program.

Further, to enable subscribers to make a response on a particular program to signify, for example, their acceptance of an item exhibited for sale on that program, a tone generator 62 may be provided in the subscriber's terminal unit 42 for generating a tone which can be sent back over the conductor pair 46 to the exchange upon actuation of a button switch 63. Such tones received at the program exchange may be detected by a tone identification device 64 which may be arranged to provide on its output line 65 a signal suitable for use by a computer or other such device arranged to record the subscriber's response to the exhibited item.

What is claimed is:

1. A wired broadcasting system for transmitting information containing signals from any one of a selectable plurality of signal sources to any one of a plurality of receivers at different subscriber stations comprising in combination, a central program exchange having switching equipment coupled to each subscriber station to select one of said signal sources, a first pair of signal transmission wires conveying the selected program to the subscriber's station, a second pair of control wires connected between said program exchange and each said subscriber station isolated from the signal transmission wires, and a selection device at the subscriber's station connected by said control wires for operating only the switching equipment coupled to the subscriber's line at the program exchange to select a designated one of the signal sources.

2. A system as defined in claim 1 wherein the control wires consist of a twisted pair of wires located in interstices between the two signal wires.

3. A system as claimed in claim 1, wherein each subscriber's station is provided with a program selection switch connected with means to apply control signals to said set of control wires for actuating said switching equipment.

4. A system as defined in claim 1 wherein the including means metering charges with means providing different fee schedules for different programs.

5. A system as defined in claim 1 including a feeder cable to each subscriber station from said switching equipment consisting of a pair of signal wires and a pair of control wires.

6. A system as defined in claim 5 provided with a cable containing feeders to a plurality of subscriber's sets each terminating at a corresponding set location.

7. A system as defined in claim 5 including transmission means indicating a condition at said subscriber's station wherein said selection device at each subscriber's station comprises means for generating and sending to said program exchange at least one tone signal auxiliary to the program selection signals to indicate acceptance of the subscriber of said condition.

8. A system as defined in claim 7 including means responsive to said tone signal to meter charges for subscribing to a selected program.

9. A system as claimed in claim 1, wherein said program exchange comprises a plurality of program selection devices each single selection device coupled through said control wires with a selection device of a single corresponding subscriber.

10. A system as claimed in claim 9, wherein the subscriber has an acceptance device to indicate acceptance of cost of a program wherein at least one program selection device is constructed to select predetermined programs only in response to operation of said acceptance device by the subscriber.

11. A system as defined in claim 9, including means in each program selection device denying selection of at least one program to subscribers not belonging to a predetermined group.

12. A system as claimed in claim 11, including a program lock out switch between the switching equipment and the subscriber's station.

13. A system as defined in claim 12, including a pay program indicator in the subscriber's station and means actuating it into indicate those programs which require payment.

14. A system as defined in claim 13, including means operable by the subscriber to indicate charges are accepted for a pay program.

* * * * *